Nov. 17, 1964 W. J. GRUEN 3,157,781
SIGNAL CORRELATION SYSTEM
Filed Oct. 27, 1960 4 Sheets-Sheet 1
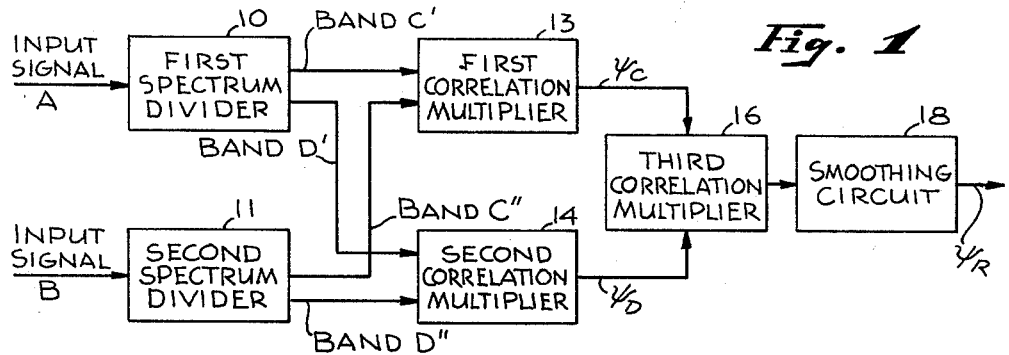
Fig. 1
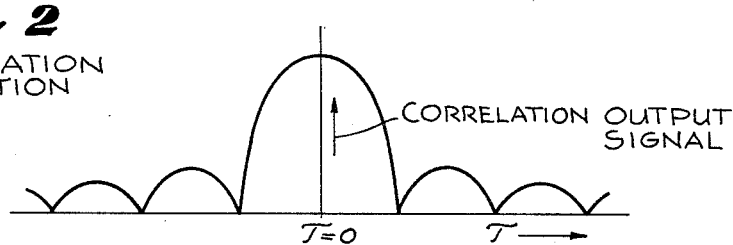
Fig. 2
CORRELATION FUNCTION
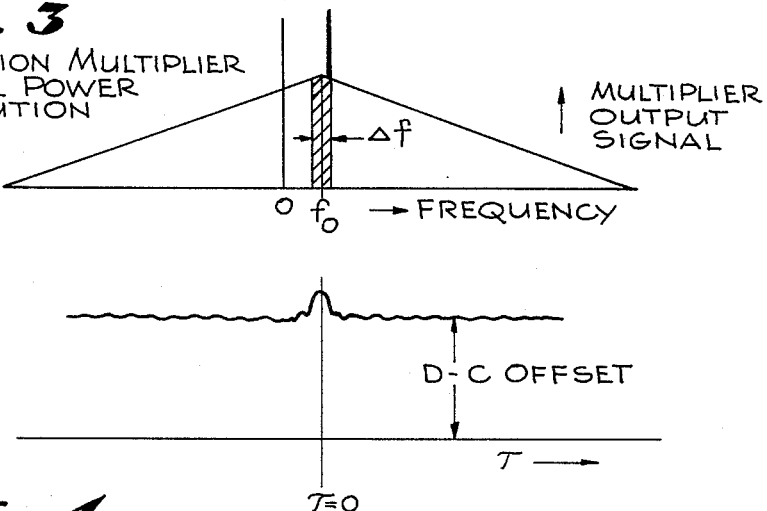
Fig. 3
CORRELATION MULTIPLIER SPECTRAL POWER DISTRIBUTION
Fig. 4
CORRELATION FUNCTION WITH D-C OFFSET
WOLF J. GRUEN
INVENTOR.
BY Fraser and Bogucki
ATTORNEYS Nov. 17, 1964
W. J. GRUEN
3,157,781
SIGNAL CORRELATION SYSTEM
Filed Oct. 27, 1960
4 Sheets-Sheet 2
*Fig. 5* FREQUENCY SPECTRUMS IN FIG. 1
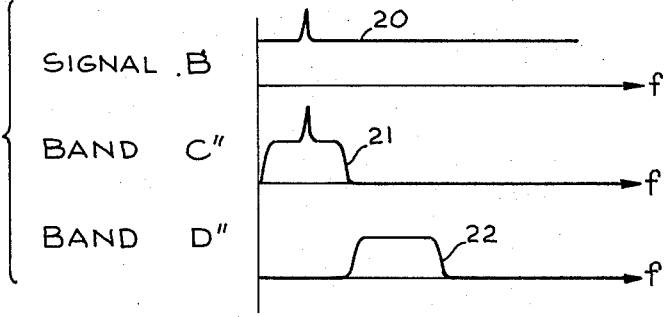
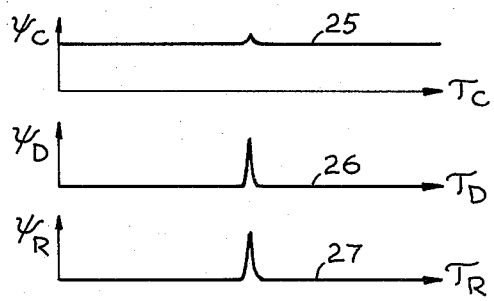
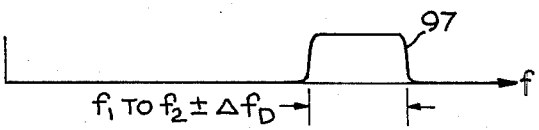
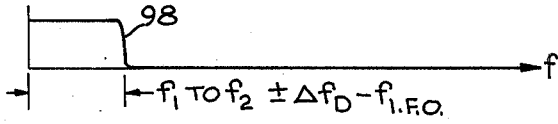
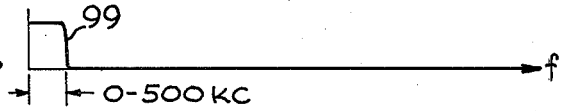
FREQUENCY SPECTRUMS ARISING IN THE OPERATION OF THE SYSTEM OF FIG. 6
*Fig. 7*
WOLF J. GRUEN
INVENTOR.
BY Fraser and Bogucki
ATTORNEYS

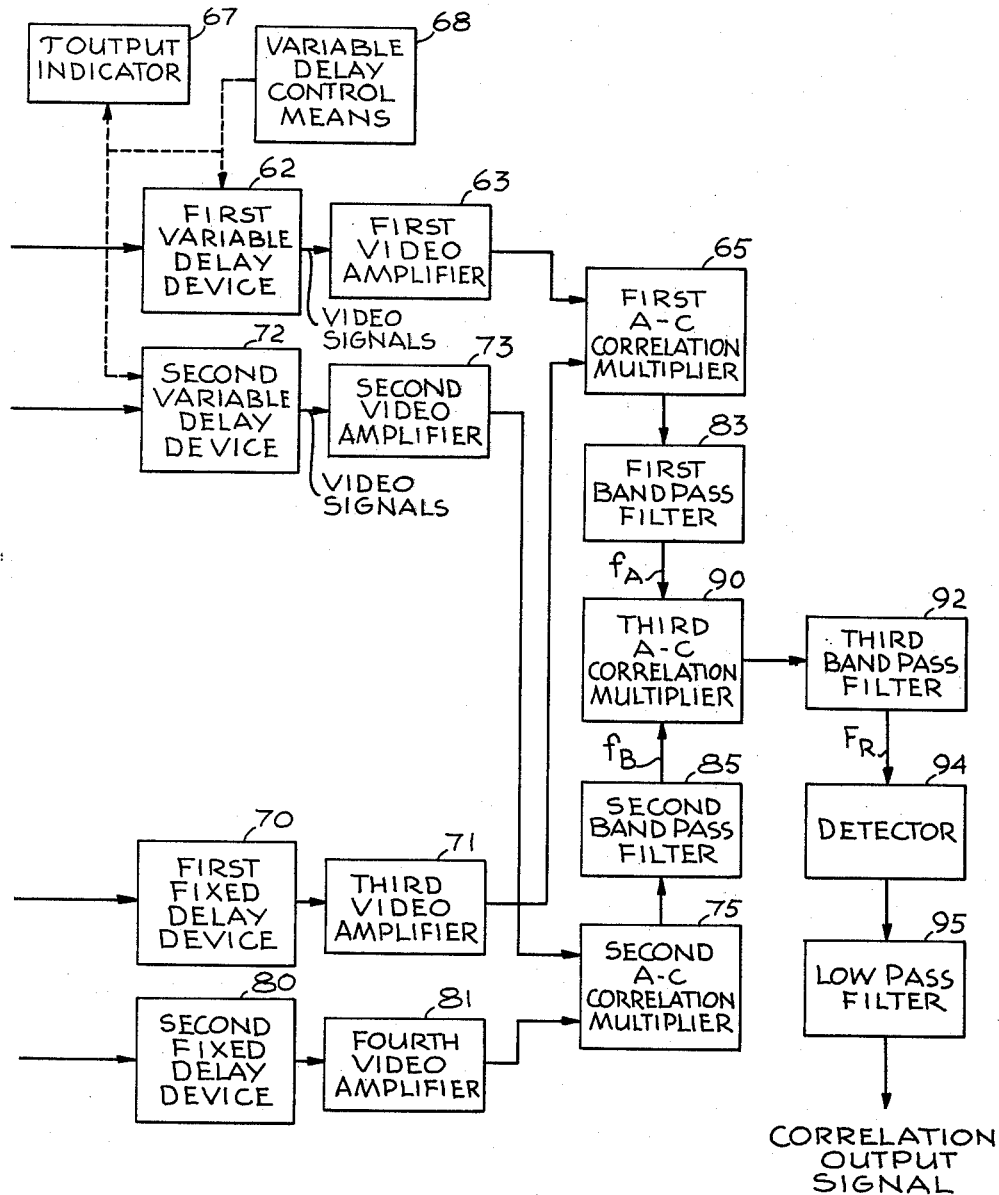

United States Patent Office 3,157,781
Patented Nov. 17, 1964

3,157,781
SIGNAL CORRELATION SYSTEM
Wolf J. Gruen, Tarzana, Calif., assignor to Thompson Ramo Wooldridge Inc., Canoga Park, Calif., a corporation of Ohio
Filed Oct. 27, 1960, Ser. No. 65,384
12 Claims. (Cl. 235—181)

This invention relates to signal correlation systems, and more particularly to improved electrical signal correlators having a high degree of accuracy and reliability.

The "correlation" of signals is a widely used process through which useful information can be derived about the presence and timing relationship of electrical signals which may be largely obscured by noise. Time varying electrical signals having signal components which are at least partially mutually coherent may be correlated by being multiplied together to form a product signal which is then smoothed, or time averaged, to provide a correlation output signal. The correlation function of two input signals is defined in graphical form, by the variation in the magnitude of a correlation output signal with respect to a range of relative timing displacements between the mutually coherent signal components of two signals. Usually, the mutually coherent signal components of the two signals do not occur in time coincidence with each other, but are displaced by some unknown magnitude of relative timing displacement which it is desired to determine.

Signal correlation systems often use variable delay devices to introduce a known amount of relative delay between the mutually coherent signal components of the two signals in order to bring the mutually coherent signal components of the two signals into time coincidence, i.e., a condition of maximum correlation. The inserted delay then precisely counteracts the initial relative timing displacement, and provides a basis for a measurement of the amount of the relative timing displacement. Typical means for ascertaining when the mutually coherent signal components have been placed in time coincidence may consist of a threshold circuit which is arranged to indicate when the correlation output signal exceeds a predetermined magnitude.

The two input signals may be regarded as containing mutually coherent signal components when the spectral power distribution of each contains a complex multifrequency component which substantially conforms to a given amplitude versus time function, although possibly differing in peak amplitude and timing in the two signals. In a relatively simple form of what may be termed a "D.-C. correlator" it is desired to multiply the input signals together without significant phase or frequency shift between equivalent monofrequency components in the two signals. On subsequent smoothing of the product signal thus generated, there is derived a D.-C. output signal whose amplitude provides a measure of the magnitude of the relative timing displacement, from a time coincident relationship, of the mutually coherent signal components. A number of practical difficulties are encountered in attempting to multiply signals together in this manner, however. A primary difficulty arises from the fact that the phase relationships of the signals which are multiplied together are not precisely known. For given relatively small changes in relative timing displacement the phase fluctuations lead to fine structure of closely spaced variations under the correlation function. This fine structure causes large variations of the output signal for very small increments of timing displacement between the two signals, unless complicated means are employed to obviate the phase effects on the output signal of the D.-C. correlator.

The phase problem is largely overcome through the use of what may be termed an "A.-C." or "offset" correlator. In A.-C. correlators, initially equivalent monofrequency components in the two signals are modified so as to be multiplied together with a predetermined offset or difference frequency. The product signal then derived is at the offset frequency, and the magnitude of the correlation function is equal to the peak amplitude of this offset frequency signal. An A.-C. smoothing circuit extracts the correlation output signal by accepting only product signal components in the vicinity of the offset frequency. An amplitude detector is used to measure the magnitude of the offset frequency signal, thereby providing a D.-C. signal whose amplitude, after smoothing, is proportional to the magnitude of the correlation function at the given relative timing displacement between the two signals.

In A.-C. correlators, however, there may be a serious "D.-C. offset" problem. The "D.-C. offset" appears as a bias in the correlation output signal and arises from the fact that the input signals may be shifted in frequency, in addition to the desired frequency offset, because of Doppler effects, thereby requiring a relatively wide A.-C. smoothing network. As is well known, an appreciable shift in frequency may be introduced to radiation from a given source, as perceived by an observer or receiver, because of relative motion between the source and the receiver. The limits of probable variations in the Doppler shift are usually known for any given correlator application, and the acceptance band of the A.-C. smoothing circuit of the correlator is accordingly made broad enough to encompass frequency shifts arising for this reason.

In broadening the acceptance band at the A.-C. smoothing circuit, however, a greater proportion of the signal energy is contributed to the output signal by noise components than is contributed by the mutually coherent product signal components. The spectral power distribution of the signal appearing at the output terminals of the multiplier may in fact consist almost entirely of components contributed by noise, with only a very small percentage being contributed by the mutually coherent signal components. Thus, upon detecting and smoothing the output signal, the noise contributions may hold the correlation output signal at a relatively constant D.-C. offset level. Since relatively small excursions from the D.-C. offset level must identify legitimate signal indications and must be distinguished by appropriate threshold detection techniques, it is evident that very stringent requirements are imposed on the stability of a threshold system which must operate with a high D.-C. offset level, but nevertheless sensitively respond to small signal peaks above the D.-C. offset level.

A different type of problem, but one which also militates against system sensitivity and accuracy, is presented by the presence of continuous wave (C.W.) or very narrow-band components in the input signals. Highest accuracies in time difference measurement are obtained with wide-band distributions of complex multifrequency components, including wide-band noise. On the other hand, when one C.W. signal is correlated with another, the magnitude of the correlator output signal is effectively the same, no matter what the relative timing displacement of the two signals. The presence of strong C.W. or relatively narrow-band components in the input signals has usually sharply diminished the ability of prior art systems to perform highly accurate time difference measurements.

Correlators in accordance with the present invention overcome these and other disadvantages of prior art correlators by so arranging the signal components which are multiplied that the noise contributions at the output terminal of the final A.-C. smoothing network are very small in amplitude. These noise components therefore do not introduce an appreciable D.-C. offset into the correlation output signal after final detection.

In accordance with one aspect of the present invention, the input signals which are to be correlated may be segmented into separate frequency bands, and the segmented signals may be multiplied together with selected frequency relationships to provide a narrow-band correlation product signal at a chosen offset frequency. This correlation product signal is substantially unaffected by Doppler shifts and the presence of narrow-band components in the input signals, and may then be passed through a smoothing circuit to provide a correlation output signal of high sensitivity and accuracy.

In accordance with more detailed aspects of this invention, a pair of A.C. correlation multipliers may be employed, each being arranged to multiply signal components in a unique part of the frequency band of one input signal by signal components in a unique part of the frequency band of the other input signal. The product signals thus derived are arranged to have a fixed difference in center frequency, which fixed difference is substantially unaffected by Doppler frequency shifts in the input signals, because both product signals are substantially affected equally. The product signals are then multiplied together to provide a final correlation product signal which has an extremely narrow bandwidth and is at a given center frequency. The noise components in the product signals which are multiplied together are then subjected to very narrow-band filtering, so that noise contributions to the correlation output signal are at an irreducible minimum. Because of the division of the frequency bands of the two input signals, and the separate multiplications of the different parts, the narrow-band components which may exist in one of the frequency bands do not predominate in the ultimate correlation output signals. Thus the correlator may accurately ascertain the relative timing displacement at which there is maximum correlation, despite the presence of narrow-band components.

A better understanding of the invention may be had by reference to the following description, taken in conjunction with the accompanying drawings, in which:

FIG. 1 is a block diagram of a correlator system in accordance with the present invention;

FIG. 2 is a graph of a typical correlation function;

FIG. 3 is a graph of the spectral power distribution of signals provided from the multiplier of a correlator;

FIG. 4 is a graph illustrating the effect of D.-C. offset on a correlation function;

FIG. 5 is a series of graphs illustrating various frequency spectrums and correlation signals appearing in the operation of the system of FIG. 1;

Figure 6:
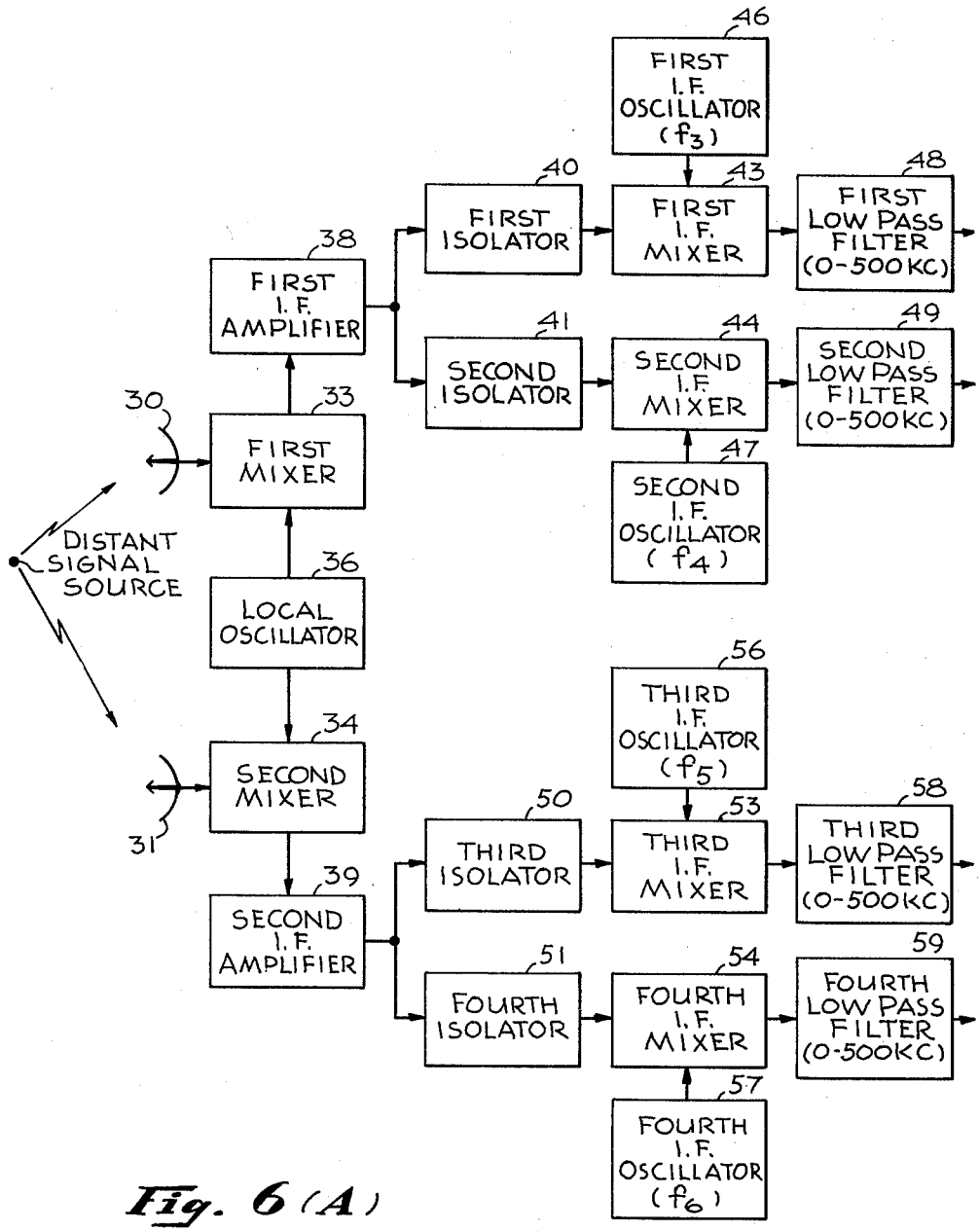

FIGS. 6(A) and 6(B) taken together are a detailed block diagram of a correlator in accordance with the invention; and FIG. 7 is a series of curves of signal magnitude plotted against frequency for different frequency spectrums which may be encountered in the operation of the system of FIG. 6.

FIG. 1 provides an example of the principal elements of one form of system arranged in accordance with the present invention. With this system, it is intended to correlate two input signals, here called A and B, and to provide a correlation output signal. Input signal A and input signal B are assumed to contain mutually coherent signal components which are displaced in timing by some unknown magnitude of relative timing displacement. Each signal is also subject to varying and unknown magnitudes of frequency shift arising because of the Doppler effect. Further, the spectral power distribution of each of the signals may be assumed to contain, at varying times, a C.W. or narrow-band component. The correlator system is therefore required simultaneously to overcome most of the difficulties encountered in prior art systems in order to achieve an accurate result.

In accordance with the present invention, each of the input signals A and B is segmented or divided into two parts. That is, the spectral power distributions of each of the signals are divided into two separate and here mutually exclusive spectral power distributions. To achieve this result, input signal A is passed through a first spectrum divider 10 and input signal B is passed through a second spectrum divider 11. In one readily realized exemplification, the spectrum dividers 10 and 11 may consist of band-pass filters, each arranged to pass a different half of the frequency spectrum of the associated input signal. Input signal A is divided into a band C' and a band D', while input signal B is divided into a band C" and a band D". As is discussed in greater detail below, each of the related bands C' and C" or D' and D" may have like spectral power distributions, or may be offset in frequency. The signals in each of the two different pairs of frequency bands which are thus created are then applied to different correlation multipliers 13 and 14 respectively. The correlation multipliers 13 and 14 provide noise products as well as products due to mutually coherent signal components. A first correlation multiplier 13 receives the signals in bands C' and C", respectively, and provides a correlation signal $\psi_C$. The second correlation multiplier 14 receives the signals in bands D' and D" and provides a correlation signal $\psi_D$.

The correlation multipliers 13 and 14 are to be distinguished from correlator systems, in that the correlation signals which they provide are in a form which permits subsequent minimization of noise contributions. If A.-C. correlation multipliers are used, for example, they may be considered to include relatively wide-band Doppler filters for filtering out signals at frequencies outside the range of interest. Such filtering passes interfering noise as well as mutually coherent signal components. The remaining elements of the usual smoothing circuit, specifically the detector and low-pass filter, however are not employed because the detector would introduce a D.-C. offset. Accordingly, the wide-band filtered signals $\psi_C$ and $\psi_D$ from the first and second correlation multipliers 13 and 14 may be spoken of as correlation signals, but not as correlation output signals.

The two correlation signals $\psi_C$ and $\psi_D$ are then applied to the input terminals of a third correlation multiplier 16 which develops a correlation product signal which in turn is passed through a smoothing circuit 18 to provide the system correlation output signal $\psi_R$. By "smoothing circuit" is meant, in the usual case, a series arrangement of band-pass filter, rectifier or detector, and final low-pass filter.

In the operation of the arrangement of FIG. 1, the first and second correlation multipliers 13 and 14 separately multiply the signals which are applied to them to provide products containing noise contributions. The signal information contained in the separate frequency bands into which the input signals A and B are divided is different for each of the signals, and the correlation multipliers 13 and 14 are operated to place the mutually coherent signal components in bands C' and C" or bands D' and D" in time coincidence; therefore, unrelated noise is present in each of the correlation signals $\psi_C$ and $\psi_D$. The presence of a narrow-band signal component in a part of one of the input signals A or B might tend to flatten out the characteristic variation, when plotted against relative timing displacement of one of the correlation signals $\psi_C$ or $\psi_D$. The predominant factor in the output signal from the third correlation multiplier 16, however, will then be the sharp peak characteristic observed by the output signal from the other of the correlation multipliers 13 or 14, and not the signal which varies according to a flattened out characteristic. Thus the system operates to minimize the presence of C.W. or narrow-band signal components in one of the input signals.

While the correlation signals $\psi_C$ and $\psi_D$ include random noise, the noise in each of the two channels conforms to different amplitude versus time functions, so that the noise patterns are random relative to each other. At the same time, the signals applied to the third correlation multiplier 16 have a known frequency relationship substantially irrespective of Doppler shift. Thus, when the signals are multiplied against each other in the third correlation multiplier 16 the signal from the multiplier 16 may be subjected to very narrow-band filtering about a fixed frequency. The time-averaged output signal $\psi_R$ from the smoothing circuit 18 contains a minimum noise contribution.

A better understanding of the operation of the arrangement of FIG. 1 and similar systems in accordance with the invention may be had by reference to the curves of FIGS. 2 through 5. FIG. 2 is a plot of the observed magnitude of a correlation output signal versus values of the magnitude of relative timing displacement between two signals which are multiplied together in a correlation multiplier, this latter magnitude being assigned the symbol tau ($\tau$). The correlation function which is thus defined typically takes the form of the mathematical function $$\frac{\sin X}{X}$$

but with negative variations of output signals folded over to positive values. The value $\tau=0$ corresponds to the event of coextensive time coincidence, or maximum correlation, between mutually coherent signal components of the respective input signals as they reach the correlation multiplier. Thus, the absolute value of relative time delay which is introduced between the initial signals to produce this maximum can then be taken to be substantially equal to the sought after absolute value of the magnitude of relative timing displacement between input signal A and input signal B.

The manner in which a D.-C. offset is originated may be visualized by reference to FIG. 3, which illustrates the spectral power distribution at the output terminals of a correlation multiplier which receives input signals having mutually coherent signal components and interfering noise. The noise is assumed to be of constant power density over a limited bandwidth. The signals, including the noise, are assumed to have different center frequencies, so that the output signals from the correlation multiplier center about a difference or offset frequency $f_0$.

The spectral power distribution which is contributed by the unrelated or non-corresponding noise components defines an isosceles triangle whose base lies along the frequency axis. The length of this base is determined by the bandwidth of the input signals, and the midpoint of the base lies at the offset frequency $f_0$. The spectral power distribution which is shown represents only the difference components between the two input signals. A spectral power distribution which is formed by the sum signals and which has a like triangular distribution at higher frequencies has not been shown in order to simplify the figure.

Part of the spectral power distribution which is contributed by the mutually coherent or corresponding signal components consists of what may be termed a power spike at or adjacent to the peak of the triangular distribution. Where, as here, the limits of the frequency bands of the interfering noise are fixed, the power spike may depart along the frequency axis from the offset frequency $f_0$. The extent of this departure is determined by the magnitude of the Doppler frequency shift introduced between the input signals. In order to encompass all probable positions of the power spike along the frequency axis the associated smoothing circuit must have an acceptance band $\Delta f$ which is sufficiently wide to encompass the expected range of Doppler shifted frequencies.

In deriving a correlation output signal, then, the associated smoothing circuit effectively integrates energy contributions from signals falling within the triangular distributon and between the limits defined by $f_0 \pm \Delta f/2$, as well as the area of any power spike generated because of the existence of mutually coherent signal components. Whether or not a spike exists, therefore, the smoothing circuit will receive at least a minimum signal contribution from the noise. Significantly, this minimum signal contribution actually constitutes a very high percentage of the maximum signal which is expected to be derived. With prior art systems the noise contribution is orders of magnitude greater than legitimate signal contribution. Accordingly, because of the noise contributions the correlation output signal from the bandpass filter, detector and low-pass filter combination in the smoothing circuit holds a quiescent, or D.-C. offset, level which is relatively high and substantially constant.

The effect of this D.-C. offset upon the shape of the cerrelation function may be seen graphically in FIG. 4, which may be contrasted to the typical correlation function of FIG. 2. FIG. 4 represents different values of magnitude of the correlation output signal taken from a smoothing circuit, over a range of values of the magnitude of $\tau$. Between relatively broad limits, for purposes of correlation, the correlation output signal is at least at the D.-C. offset level. Only when the mutually coherent signal components have been brough substantially into maximum correlation does a discernible peak exist. This peak, however, has been exaggerated for clarity in FIG. 4.

Systems in accordance with the invention, such as the correlator of FIG. 1, effectively minimize the D.-C. offset by so arranging the noise components which are applied to the input terminal of the correlation multiplier 16 that these noise components contribute minimum energy to the correlation output signal. Because the frequency placement of the mutually coherent signal components at the final multiplier is known, a filter may be used which has a bandwidth only wide enough for proper excitation by legitimate signal indications. Thus, noise contributions to the correlation output signal are minimized. The signal excursion existing in the correlation output signal at the maximum correlation relationship is now markedly greater than quiescent level, and may be much more readily distinguished. A threshold circuit, for example, need not have a large dynamic range in order to distinguish a small additional excursion denoting maximum correlation.

The general manner in which the systems in accordance with the invention overcome the problem of the existence of C.W. or narrow-band signal components may be better understood by reference to FIG. 5. In FIG. 5(A), input signal B is shown by an idealized curve 20 as having a relatively broad-band frequency spectrum of substantially even power distribution except for strong narrow-band components in one frequency region. When input signal B is passed through the second spectrum divider 11 and split into the band C″ and band D″ signals, two separate frequency spectrums represented by the curves 21 and 22 result. The narrow-band components are now contained in only one of the frequency spectrums, and the other is broadband. Input signal A (not shown in FIG. 5) has the same characteristics as signal B, but has some unknown relative timing displacement.

The correlation signals, $\psi_C$ and $\psi_D$, from the first and second correlation multipliers 13 and 14 and the correlation output signals $\psi_R$ from the smoothing circuit 18 are represented partially in modified form in FIG. 5(B) as the curves 25, 26 and 27. The $\psi_C$ and $\psi_D$ signals shown are not the actual correlation signals from the first and second multipliers 13 and 14, but the equivalent correlation output signals which would result upon application to appropritae time-averaging circuits. This modification is made in the graphical representation in order to present a clearer comparison to the ultimate correlation output signal $\psi_R$. In the operation of the first correlation multiplier 13 over a range of relative timing displacements the presence of the narrow-band component in input signal B causes the resultant equivalent correlation signal $\psi_C$ to have a substantially constant characteristic, as indicated by curve 25. The broadband signals supplied to the second correlation multiplier 14, however, permit the equivalent correlation signal $\psi_D$ to follow a sharply defined correlation function, as shown by the curve 26. The correlation function which is followed by the actual correlation output signal $\psi_R$ from the smoothing circuit 18 is therefore the result of multiplying a sharply changing variable by a constant, thus reproducing the characteristics of the sharply changing variable. Curve 27, representing variations in $\psi_R$, may be seen in FIG. 5(B) to be similar to curve 26, representing variations in $\psi_D$. The system therefore produces a narrow-band unambiguous correlation function despite the presence of narrow-band or C.W. components.

A detailed example of a system in accordance with the invention is provided by the block diagram of FIG. 6. The system there shown may be used in conjunction with communications systems, position location systems, and the like. It should be understood that the system is useful for the general purpose of counteracting interfering signals, and thus may extract information from signals as well as make time difference measurements. Input signals which are to be analyzed and which emanate from a pair of separate, spaced-apart antennas 30 and 31 may be used. Here the source of radiation is assumed to be sufficiently distant, or the signals relatively weak, for the signals derived at the two spaced-apart antennas 30 and 31 to be largely obscured by interfering noise. The antennas 30, 31 are coupled to a correlator system, in accordance with the invention, for determination of the relative timing displacement between the mutually coherent signal components of the two signals. Amplifiers and other signal processing equipment which might be coupled to the antennas have been omitted where convenient in order to simplify the diagram. For purposes of simplification also, it is assumed that the antennas 30 and 31 are equally distant from a processing center at which the remainder of the equipment shown in FIG. 6 is located. Thus the relative timing displacement between the mutually coherent signal components as they appear in the subsequent circuits is not disturbed, although it will be recognized that appropriate delay elements might be used to compensate for relatively unequal path lengths from the antennas 30, 31 to the coupled processing circuits.

The signals derived at each of the antennas are passed into different ones of two signal channels. For a number of the elements in each of the signal channels there is a correspondence both in structure and mode of operation to elements in the other signal channel. Where such correspondence exists, a duplicate detailed description will not be provided but the description of one part should be taken to apply to the corresponding element as well.

Signals received at the antennas 30, 31 are applied to first and second mixers 33, 34, respectively, which are also coupled to receive reference signals at a selected frequency from a local oscillator 36. The frequency of the local oscillator 36 is selected such that the first and second mixers 33, 34 provide difference frequencies in an intermediate frequency band (hereinafter IF) extending from $f_1$ to $f_2$. Band-pass filters (not shown) may be used to separate out this IF band and the signals appearing on the output terminals of the mixers 33, 34 may be separately amplified in first and second IF amplifiers 38, 39 respectively. The signals provided from the IF amplifiers 38, 39 are then passed first through spectrum dividers and subsequently into first and second correlation multipliers.

In a first one of the spectrum dividers, signals from the first IF amplifier 38 are divided in a branching network and passed in parallel through first and second isolators 40, 41, or matching networks which insure that there is no unwanted interaction between the two parts of the divided signals. The divided signals are then each applied to one of the terminals of a different one of first and second IF mixers 43, 44 respectively. The first IF mixer 43 receives reference signals from a first IF oscillator 46 at a selected frequency, $f_3$, while the second IF mixer 44 receives reference signals from a second IF oscillator 47 at another selected frequency, $f_4$. In one arrangement, reference signal $f_3$ is on the high side of the IF frequency band $f_1$ to $f_2$, and $f_4$ is on the low side. Sum and difference signals appearing on the output terminals of the first and second IF mixers 43 and 44 respectively are coupled into first and second low-pass filters 48, 49 respectively. Both these low-pass filters 48, 49 have a selected cut-off frequency, here approximately 500 kc. However, the values selected for the frequencies of the various input signals, reference signals and band-pass filters may vary widely from system to system.

The first and second low-pass filters 48, 49 complete the spectrum divider circuits which operate with signals from the first one of the antennas 30. In like fashion, signals from the other antenna 31 are passed through two parallel branches, one of which consists of a third isolator 50, a third IF mixer 53, a third IF oscillator 56 and a third low-pass filter 58, while the other branch consists of a fourth isolator 51, a fourth IF mixer 54, a fourth IF oscillator 57 and a fourth low-pass filter 59, with each of the elements in these two branches being coupled in a fashion similar to that previously described. The third IF oscillator 56, however, is chosen to provide a reference signal at a difference selected frequency, $f_5$, whereas a signal at yet another frequency, $f_6$, is selected for the fourth IF oscillator 57. The third and fourth low-pass filters 58, 59 have selected cut-off frequencies, as for example, approximately 500 kc.

The reference signals $f_5$ and $f_6$ are chosen to be in the high and low ends of the IF band $f_1$ to $f_2$, respectively, and are also selected with relation to the other reference signals $f_3$ and $f_4$. Specifically, at the high end of the band $f_1$ to $f_2$, $f_3$ is made greater than $f_5$ by an amount $f_A$, while at the low end $f_4$ is made greater than $f_6$ by an amount $f_B$. The difference frequencies $f_A$ and $f_B$ in turn differ by a selected amount $f_R$. The system operation makes effective use of these frequency differences, although it will be apparent that other relationships between the frequencies may be used as well.

The first correlation multiplier system employed with this configuration utilizes signals derived at the output terminal of the first low-pass filter 48 as one input signal, and signals derived at the output terminal of the third low-pass filter 58 as the other input signal. The second correlation multiplier derives its input signals from the second low-pass filter 49 and the fourth low-pass filter 59. At the first correlation multiplier, signals passed by the first low-pass filter 48 are applied as video signals through a first variable delay device 62 and a subsequent first video amplifier 63 to one input of a first A.-C. correlation multiplier circuit 65. The first variable delay device 62 may be a magnetic recording device having a long or endless length of magnetic recording medium and reproducing and recording heads which are movable relative to each other to provide the variable delay.

Alternatively, the first variable delay device 62 may be provided by a length of delay line having a continuously or incrementally selectable output tap. In the present instance, it is assumed that the variable delay device 62 is a magnetic drum on which the reproducing head is movable relative to the recording head, and that the reproducing head is mechanically coupled to an output indicator 67 which indicates the extent of movement of the reproducing head from a selected reference line. Because the extent of movement of the reproducing head may be directly equated to the difference in relative timing displacement between mutually coherent signal components the indicator 67 may be referred to as a $\tau$ output indicator. Actual control of the position of the movable element in the first variable delay device 62 is effected by a variable delay control means 68, which may provide a continuous or tracking scan, as desired.

The remaining input signals to the first A.-C. correlation multiplier 65 are derived from the video signals accepted by the third low-pass filter 58. The signals are passed through a first fixed delay device 70 and a third video amplifier 71 to the remaining input terminal of the first A.-C. correlation multiplier 65. With a magnetic drum type of variable delay device, the size and positioning equipment for the recording and reproducing head do not permit the delay to be reduced below some minimum magnitude, and the first fixed delay device 70 introduces sufficient delay to compensate for this minimum.

In a disposition similar to that used for the first correlation multiplier system, the second correlation multiplier system derives its input signals from the signals passed by the second low-pass filter 49 and the fourth low-pass filter 59. That is, video signals appearing at the output terminal of the second low-pass filter 49 are passed through a second variable delay device 72 and a subsequent second video amplifier 73 to one input of the second A.-C. correlation multiplier circuit 75. The magnitude of the delay introduced in the signals passing through the second variable delay device 72 is controlled by the variable delay control means 68 and the extent of the delay is indicated at the $\tau$ output indicator 67. Separate delay control means and output indicator means may, of course, be employed for the second variable delay means 72 if desired. Signals appearing on the output terminal of the fourth low-pass filter 59 are directed through a second fixed delay device 80 and a fourth video amplifier 81 to the remaining input terminal of the second A.-C. correlation multiplier circuit 75.

The correlation product signals which are generated by the first A.-C. correlation multiplier 65 are applied to a first band-pass filter 83 having a center frequency corresponding to the difference $f_A$ between the reference frequencies $f_3$ and $f_5$. The filter 83 introduces A.-C. smoothing into the product signal. The width of the pass band, $\Delta f$, is selected to be wide enough (here 10 kc.) to encompass probable frequency shifts likely to arise because of the Doppler effect. The correlation product signal from the second A.-C. correlation multiplier circuit 75 is likewise filtered and A.-C. smoothed by a second band-pass filter 85, for which the center frequency $f_B$ corresponds to the difference frequency between the reference signals $f_4$ and $f_6$. A like pass band may also be employed.

The output signals passed by the first band-pass filter 83 and the second band-pass filter 85 thus represent A.-C. smoothed correlation signals from the first and second correlation multiplier systems.

These correlation signals are applied to the separate input terminals of a third A.-C. correlation multiplier 90, and a system correlation output signal is derived from the resultant product signal by a series combination of a third band-pass filter 92, a detector 94 and a low-pass filter 95. The center frequency of the third band-pass filter 92 is the difference frequency $f_R$ between the frequencies $f_A$ and $f_B$. The bandwidth may, however, be made as narrow as is convenient or practical for the signal which is available to excite the filter 92. The detector 94 and low-pass filter 95 combination extract a D.-C. signal which provides a measure of the average peak amplitude, over a selected averaging interval, of the A.-C. smoothed signal from the third band-pass filter 92. If desired, a threshold circuit (not shown) may be coupled to the low pass filter 95 so as to indicate excursions greater than a predetermined magnitude in the output signal.

The first and second correlation multiplier systems function similarly to provide correlations product signals at specific offset frequencies $f_A$ and $f_B$. The operation of only one of these correlation multipliers need be described in detail. Signals in the frequency band occupied by the distant signal source are received at the antenna 30 and are then mixed with signals from the local oscillator 36 in the first mixer 33. Through this heterodyning action, representations of the initial signals are developed in the IF band, at frequencies from $f_1$ to $f_2$. These signals are then applied to both the first and second IF mixers 43 and 44, with the spectrum division being completed by the mixing and subsequent filtering. The frequency of the first IF oscillator 46 ($f_3$), is set relatively high in the $f_1$ to $f_2$ band. When the reference signal at frequency $f_3$ is subtracted from the signals in the $f_1$ to $f_2$ band, difference signals are generated in the 0 to 500 kc. band which are representations of the upper frequency portion of the $f_1$ to $f_2$ band. As a simple illustration, it may be observed that heterodyning signals of 9.800 mc. and 10.000 mc. provides a 200 kc. difference signal, while heterodyning 9.800 mc. and 9.500 mc. provides a 300 kc. difference signal.

When the signals in the $f_1$ to $f_2$ band are mixed in the second IF mixer 44 with the signals at the frequency, $f_4$, from the second IF oscillator 47, however, the difference signals which are generated in the 0 to 500 kc. band represent the lower part of the $f_1$ to $f_2$ spectrum. Only those input signals having frequencies in the range $f_4 \pm 500$ kc. will result in the generation of IF signals at less than 500 kc., for example.

The results of heterodyning input signal representations against the reference signals from the first and second IF oscillators 46, 47 are represented graphically in a generalized form in FIG. 7. FIG. 7 consists of three separate curves 97, 98 and 99 of spectral power distributions plotted against frequency in three separate FIGURES 7(A), 7(B) and 7(C) respectively, although dimensions along the frequency axis are not drawn to scale. For simplicity, relatively constant spectral power distributions over the given frequency spectrums have been assumed. In FIG. 7(A), representing the frequency spectrum of output signals from a microwave mixer 43, 44, 53 or 54, the curve 98 shows that the signals include a Doppler frequency shift. This shift in frequency, here designated $\Delta f_D$, causes the frequency spectrum at the output terminal of the microwave mixer to extend from $f_1$ to $f_2 \pm \Delta f_D$. The output signals from the IF mixer, represented in FIG. 7(B), encompass a frequency band which is from $f_1$ to $f_2 \pm \Delta f_D - f_{I.F.O.}$ in width, where $f_{I.F.O.}$ is the local oscillator (reference) frequency. The lower frequency region within the curve 98 falls within the upper frequency half in the band represented by the curve 97 (FIG. 7(A)) if $f_{I.F.O.}$ is a relatively high value, and falls within the lower frequency half of the band represented by the curve 97 if $f_{I.F.O.}$ is a relatively low value. Signals which fall within the acceptance band of the low-pass filter are represented in FIG. 7(C) by the curve 99. These signals include representations, for the appropriate high or low portion of the frequency spectrum of the initial input signal, of both the mutually coherent signal components and the Doppler shift introduced thereto.

The first and second low-pass filters 48, 49 therefore complete the division of the frequency spectrum of the first signal into separate, mutually exclusive bands. The third and fourth low-pass filters 58, 59 provide a similar division of the frequency components of the other input signal.

As the first variable delay device 62 changes the relative timing displacement between the mutually coherent signal components of the signals accepted by the first and third low-pass filters 48, 58, the first A.-C. correlation multiplier 65 provides a correlation product signal which contains considerable noise as well as contributions from the mutually coherent signal components. The offset frequency of this correlation product signal is determined by the difference in the reference frequencies $f_3$ and $f_5$ established by the first IF oscillator 46 and the third IF oscillator 56 respectively. In effect, representations of the first input signal which are in a frequency band referenced to $f_3$ are multiplied against representations of the second input signal in a slightly different frequency band referenced to $f_5$. The signals applied to the first A.-C. correlation multiplier 65 still characterize the mutually coherent signal components, as well as the Doppler frequencies. The correlation product signal is offset at $f_3-f_5$, or $f_A$, but is plus or minus the Doppler frequency difference. The frequency pass band $\Delta f$ of the first band-pass filter 83 (10 kc.) encompasses a reasonable range of Doppler frequency shifts while rejecting noise outside the pass band.

In the second correlation multiplier system there is a like multiplication of signal representations, but this deals with the lower parts of the frequency bands of the two input signals. The offset frequency from the second A.C. correlation multiplier 75, nominally $f_B$, or $f_4$ minus $f_6$, may be shifted in frequency because of the Doppler effect, and for this reason the band-pass of the second band-pass filter 85 is sufficiently wide to accept expected Doppler frequency differences. Whatever the extent of the Doppler frequency shift at any instant, however, it is significant to note that substantially the same shift appears in the correlation product and correlation output signals for both correlators. When these signals are multiplied together in the third A.-C. correlation multiplier 90, therefore, the mutually coherent signal components are preserved, but the offset frequency $f_R$ is substantially dependent only on the nominal center frequencies, $f_A$ and $f_B$, of the first two correlation multipliers 65, 75 and not upon the Doppler frequency.

A first significant result which is achieved in deriving the system correlation output signal, therefore, is that the A.-C. smoothing circuit which is used with the third A.-C. correlation multiplier 90 can be extremely narrow band. Thus, a filter 92 having a precise center frequency, $f_R$, is fully responsive to the mutually coherent signal components even though it has a pass band of only a few cycles. The bandwidth of the third band-pass filter 92 is in fact determined by the time during which legitimate signal indications are available to excite the filter. A long signal burst, for example, would permit a filter to be used which has minimum bandwidth.

The very narrow band A.-C. smoothing of the correlation product signal therefore effectively cuts output noise to its irreducible minimum and restricts D.-C. offset. Noise contributions are reduced, at the final correlation multiplier, and may in fact become smaller by orders of magnitude than the mutually coherent signal component contributions.

The second principal result obtained by systems in accordance with the invention is an ability to produce a narrow and unambiguous correlation function despite the presence of a C.W. or narrow-band component. When one correlation function is predominantly flat and the other has a sharp and unambiguous characteristic, the product of the two initial correlations (the result of the third correlation multiplication) is dominated by the more sharply defined correlation function.

It should be noted that in thus rejecting narrow-band components, the system operation is not affected by the relative power of the narrow-band and wide-band components. As far as system output signals are concerned, there is substantially complete rejection of signals composed entirely of narrow-band or C.W. components. It should also be noted that the results which are thus concurrently obtained do not reduce the capability of the correlator in other respects, and that no inherent limitations are thereby imposed. For example, there is no dependence upon particular input power levels, input frequency spectrums or other input signal characteristics. No special demands are placed on the design or operation of any of the components which are used.

A number of modifications may be made which will readily suggest themselves to those skilled in the art. Thus the combination of mixer and low-pass filter which is employed for spectrum division need not be used. Instead, band-pass filters may be used for splitting frequency spectrums. It may also be desired to divide the frequency bands of the two input signals at microwave frequencies, before heterodyning to produce IF signals. In addition, or separately, the various IF oscillators may be interlocked so as to reduce phase shifts which might arise within the different signal channels. It may also be desired to employ a very narrow-band filter, such as a crystal filter, in place of the third band-pass filter 92 in order to provide final A.-C. smoothing.

Although there have been described above various forms in accordance with the invention for correlating signals with relative freedom from narrow-band components and from D.-C. offset, it will be appreciated that a number of alternative arrangements are feasible. Accordingly, the invention should be considered to include all alternatives, modifications and variations falling within the scope of the appended claims.

What is claimed is:

1. A system for correlating two input signals including first A.-C. correlator means responsive only to a first frequency band of each of the two input signals for providing a first A.-C. product signal at a first offset frequency, second A.-C. correlator means responsive only to a second frequency band of each of the two input signals, the first and second frequency bands being of different frequencies and mutually exclusive, the second A.-C. correlator means providing a second A.-C. product signal at a second offset frequency having a predetermined difference from the first offset frequency, and third A.-C. correlator means coupled to receive the first and second A.-C. product signals for providing a system output signal from signal components at the predetermined difference frequency.

2. A system for correlating two input signals including first A.-C. correlator means responsive only to first frequency components of the two input signals for providing a first A.-C. product signal at a first offset frequency, second A.-C. correlator means responsive only to second frequency components, different from the first, of the two input signals for providing a second A.-C. product signal at a second offset frequency, there being a selected difference between the first and second A.-C. product signals, and means responsive to the first and second A.-C. product signals for providing a system output signal from components at the selected difference frequency.

3. A system for correlating two input signals including frequency band dividing means individually responsive to different frequency input signals, a pair of A.-C. correlation multiplier means each coupled to receive a different frequency band of each of the two input signals from the frequency band dividing means, a pair of A.-C. smoothing circuits, each coupled to a different one of the pair of A.-C. correlation multiplier means, and an A.-C. correlation means coupled to the pair of smoothing circuits.

4. A system for correlating two input signals including means responsive to the input signals for dividing the frequency bands thereof into mutually exclusive segments, first and second correlator means, each responsive to a different segmented portion of each of the input signals and each providing a correlation signal, and a third correlator coupled to the first and second correlators for receiving the correlation signals therefrom.

5. A correlation system for correlating two input signals which contain mutually coherent signal components and interfering noise, including the combination of a correlator including a multiplier, and means for coupling different frequency signal representations of the mutually coherent signal components to the multiplier, including means for dividing the input signals into separate mutually exclusive spectral power distributions.

6. A system for correlating two input signals including a first correlator means responsive only to a first band of frequency components of each of the two input signals, second correlator means responsive only to a second band of frequency components of each of the two input signals, the second band of frequency components of each of the two input signals being different from the first, and each of the first and second correlator means providing correlation signals, and third correlator means coupled to receive the correlation signals and to provide a system correlation output signal.

7. A system for correlating two input signals containing mutually coherent signal components and interfering noise, including the combination of means responsive only to a part of each of the input signals for providing a first combined signal having one noise characteristic, means responsive only to a different part of each of the input signals for providing a second combined signal having a separate noise characteristic, and means responsive to each of the combined signals for providing a correlation output signal.

8. A correlation system for eliminating the effects of narrow-band components of two input signals and of components of the input signals other than the mutually coherent signal components, including the combination of frequency sensitive means individually responsive only to different frequency portions of the input signals for dividing the frequency spectrum of each of the two input signals into high and low frequency spectrums, first and second A.-C. correlator means, each coupled to receive a different combination of the high frequency spectrum of one input signal with the low frequency of the other input signal, thus providing first and second correlation signals respectively, correlation multiplier means coupled to receive the first and second correlation output signals and to provide a correlation product signal at a selected frequency, and narrow-band filter means coupled to receive the correlation product signal and responsive to representations of the mutually coherent signal components of the input signals which are provided at the selected frequency for deriving a correlation output signal.

9. A correlation system for minimizing the effects of narrow-band components of two input signals and for minimizing D.-C. offset in the correlation output signal, including the combination of frequency sensitive means individually responsive only to different frequency components of the input signals and arranged to divide the frequency bands of each of the two input signals into high and low frequency bands having selected frequency relationships to each other, first and second A.-C. correlator means, each coupled to receive a different combination of frequency bands of each of the two input signals for providing first and second correlation signals, each of the first and second A.-C. correlator means also including means for introducing controllable and known amounts of relative delay between the applied signals, correlation multiplier means coupled to receive the first and second correlation signals for providing a correlation product signal at a selected frequency, and frequency sensitive means coupled to the correlation multiplier means and responsive to the selected frequency for providing a system correlation output signal.

10. A system for correlating two input signals containing mutually coherent signal components within selected frequency bands, including first means responsive only to selected parts of the frequency bands of each of the input signals for providing signal representations of the mutually coherent signal components therein, second means responsive only to other selected parts, different from the first, of the two input signals for providing second representations of the mutually coherent signal components, and correlator means responsive to both representations of the mutually coherent signal components for providing a correlation output signal.

11. A system for correlating two input signals including first frequency sensitive means responsive to a first of the input signals for dividing the frequency spectrum of the first input signal into mutually exclusive first high and first low frequency bands, second frequency sensitive means responsive to the second input signal for dividing the frequency spectrum of the second input signal into second high and second low frequency bands, the first high and second high frequency bands differing by a selected first offset frequency, the first low and second low frequency bands differing by a selected second offset frequency having a selected difference from the first offset frequency, first and second A.-C. correlator means, each including means for introducing controllable and known relative delays between the signals being correlated, the first A.-C. correlator means being coupled to receive the first high and second high frequency bands of the input signals, the second A.-C. correlator means being coupled to receive the first low and second low frequency bands of the input signals, each of the A.-C. correlator means providing correlation signals, a correlation multiplier coupled to receive the correlation signals from the first and second A.-C. correlator means and to provide a correlation product signal therefrom, the correlation product signal having a center frequency corresponding to the selected difference between the first and second offset frequencies, and frequency sensitive means coupled to receive the correlation product signal and responsive to signals at the selected difference frequency to provide a system output signal.

12. A correlation system for correlating first and second input signals occurring at microwave frequency and containing mutually coherent signal components and interfering noise, including the combination of first and second input signal mixer means, each coupled to receive a different one of the first and second input signals and to provide first and second intermediate frequency signals respectively, two pairs of intermediate signal mixer means, a first pair of mixer means being coupled to receive the first intermediate frequency signal and providing third and fourth intermediate frequency signals in selected frequency ranges, the second pair of mixer means being coupled to receive the second intermediate frequency signal and to provide fifth and sixth intermediate frequency signals in selected frequency ranges, first through fourth low-pass filters, each coupled to a different one of the mixer means in the first and second pairs of mixer means and each selected to accept signals in a fixed frequency band from the associated intermediate frequency signal so as to pass signals representative of variations in a unique part of the frequency band of the initial input signals, first and second A.-C. correlation multipliers, the first A.-C. correlation multiplier being coupled to receive signals accepted by the first and third low-pass filters and including means for introducing variable relative delays between the two signals, the second A.-C. correlation multiplier being coupled to receive signals accepted by the second and fourth low-pass filters and including means for introducing variable relative delays between the two signals, first and second band-pass filter means, each coupled to a different one of the first and second A.-C. correlation multipliers and each selected to accept signals in a band of frequencies related to the offset frequency of the associated correlation multiplier, A.-C. correlation multiplier means coupled to receive signals passed by the first and second band-pass filter means, narrow-band filter means coupled to the A.-C. correlation multiplier means and responsive to signals at the difference frequency between the center frequency of the first and second band-pass filter means, signal detecting means responsive to signals passed by the narrow-band filter means, and a low-pass filter coupled to the signal detecting means for providing a system correlation output signal.

References Cited in the file of this patent

UNITED STATES PATENTS

| | | |
|---|---|---|
| 2,580,148 | Wirkler | Dec. 25, 1951 |
| 2,718,638 | Rosa et al. | Sept. 20, 1955 |

OTHER REFERENCES

A Microwave Correlator (Page, Brodzinsky, Zirm), Proceedings of the IRE, January 1953, pp. 128–131.